United States Patent
Choi et al.

(10) Patent No.: US 6,882,098 B2
(45) Date of Patent: Apr. 19, 2005

(54) COLD CATHODE ELECTRON SOURCE

(75) Inventors: Young-Chul Choi, Suwon (KR); Ji-Hoon Ahn, Seoul (KR); Hyek-Bok Rhee, Seoul (KR); Dong-Hee Han, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 2 days.

(21) Appl. No.: 10/223,625

(22) Filed: Aug. 20, 2002

(65) Prior Publication Data

US 2003/0160556 A1 Aug. 28, 2003

(30) Foreign Application Priority Data

Feb. 25, 2002 (KR) ........................................ 2002-10012

(51) Int. Cl.[7] .................................................. H01J 1/62
(52) U.S. Cl. ........................ 313/495; 313/309; 313/351; 313/336; 313/497
(58) Field of Search .............................. 313/495, 309, 313/351, 336, 497

(56) References Cited

U.S. PATENT DOCUMENTS

| | | | |
|---|---|---|---|
| 5,066,883 A | * 11/1991 | Yoshioka et al. | ........... 313/309 |
| 6,062,931 A | 5/2000 | Chuang et al. | |
| 6,135,839 A | * 10/2000 | Iwase et al. | .................. 445/24 |
| 6,232,706 B1 | 5/2001 | Dai et al. | |
| 6,541,906 B1 | * 4/2003 | Lee et al. | .................... 313/495 |
| 6,605,894 B1 | * 8/2003 | Choi et al. | ................... 313/495 |
| 2002/0060516 A1 | * 5/2002 | Kawate et al. | .............. 313/495 |

FOREIGN PATENT DOCUMENTS

| | | |
|---|---|---|
| EP | 1 129 990 | 9/2001 |
| KR | 1020020003782 | 1/2002 |
| KR | 1020020007626 | 1/2002 |

\* cited by examiner

*Primary Examiner*—Vip Patel
*Assistant Examiner*—Anthony Perry
(74) *Attorney, Agent, or Firm*—Robert E. Bushnell, Esq.

(57) ABSTRACT

The present invention provides a cold cathode electron source and a method for manufacturing the cold cathode electron source. The cold cathode electron source includes a substrate on which are deposited a catalyst metal layer, an insulation layer, and a gate metal layer; a cavity section formed through the catalyst metal layer, the insulation layer, and the gate metal layer; and an emitter realized through a plurality of carbon nanotubes, which are grown from walls of the catalyst metal layer exposed in the cavity section and which have long axes parallel to the substrate. The method includes depositing a catalyst metal layer, an insulation layer, and a gate metal layer on a substrate; forming a cavity section by removing a portion of the gate metal layer, the insulation layer, and the catalyst metal layer using a photo-lithography process; and forming an emitter by mounting the substrate on a chemical vapor deposition reactor and growing carbon nanotubes in a low temperature atmosphere of 500~800 degrees Celsius (° C.).

20 Claims, 4 Drawing Sheets

COLD CATHODE ELECTRON SOURCE

CLAIM OF PRIORITY

This application makes reference to, incorporates the same herein, and claims all benefits accruing under 35 U.S.C. §119 from my application COLD CATHODE EMISSION SOURCE filed with the Korean Industrial Property Office on Feb. 25, 2002 and there duly assigned Serial No. 2002-10012.

BACKGROUND OF THE INVENTION

1. Technical Field

The present invention relates to a cold cathode electron source for a field emission display, and more particularly, the present invention relates to a cold cathode electron source apparatus that uses carbon nanotubes to emit electrons by a field emission effect, and to a method for manufacturing the cold cathode electron source.

2. Related Art

A display device that realizes images by exciting a phosphor layer such as a field emission display or a cathode ray tube typically includes an electron emitting source that emits electrons needed to illuminate the phosphor layer. The electron emitting sources can be used to form a flat panel display for a computer, for example.

The two main types of electron emitting sources include the hot cathode electron source and the cold cathode electron source, depending on cathode type. The hot cathode electron source utilizes a heater. The cold cathode electron source can use carbon nanotubes.

We have found that it would desirable to develop an improved, convenient, efficient, and productive cold cathode electron source apparatus having carbon nanotubes, and a method for manufacturing the cold cathode electron source apparatus.

Exemplars of recent efforts in the art of carbon nanotubes include U.S. Pat. No. 6,062,931 for CARBON NANOTUBE EMITTER WITH TRIODE STRUCTURE issued on May 16, 2000 to Chuang et al., U.S. Pat. No. 6,232,706 for SELF-ORIENTED BUNDLES OF CARBON NANOTUBES AND METHOD OF MAKING SAME issued on May 15, 2001 to Dai et al., and European Patent No. EP 1129990A1 for PROCESS FOR CONTROLLED GROWTH OF CARBON NANOTUBES published on 5 Sep. 2001 and issued to Bower et al.

Chuang '931 describes a cold cathode emitter in which a diameter of a gate aperture is temporarily reduced by means of a sacrificial layer. Dai '706 describes a field emission device having carbon nanotubes on a substrate. The European Patent No. EP1129990A1 issued to Bower et al. describes a plasma enhanced chemical vapor deposition.

Electrons are emitted from defects located on wall surfaces of carbon nanotubes. However, such defects cannot be adequately or favorably used when the carbon nanotubes are grown vertically as in certain methods of at least some of the related art described above.

Catalyst metal particles can be present on ends of the carbon nanotubes. However, because the catalyst metal particles interfere with the electron emission of the carbon nanotubes, this limits attempts at increasing an electron density, and also increases a turn-on voltage that initiates electron emission, thereby preventing low voltage driving.

While the above-referenced related art references provide advantages, we note that they fail to adequately provide an improved, convenient, efficient, and productive cold cathode electron source apparatus having carbon nanotubes and a method for manufacturing such a cold cathode electron source apparatus.

SUMMARY OF THE INVENTION

It is an object of the present invention to provide a cold cathode electron source apparatus that uses a countless number of defects on wall surfaces of carbon nanotubes as an electron source to increase an electron density and, simultaneously, reduces a turn-on voltage, thereby improving electron emission efficiency.

It is a further object of the present invention to provide a method for manufacturing the cold cathode electron source apparatus.

In one embodiment, the present invention provides a cold cathode electron source including a substrate; a cathode electrode formed on the substrate, the cathode electrode having a cavity of a predetermined size; an emitter including a plurality of carbon nanotubes which are longitudinally formed on the wall of the cavity of the cathode electrode, the carbon nanotubes being substantially parallel to the surface of the substrate; an insulation layer formed on the cathode electrode, the insulation layer having a cavity corresponding to the cavity of the cathode electrode; a gate electrode formed on the insulation layer, the gate electrode having a cavity corresponding to the cavity of the cathode electrode.

It is preferable that the cavity of the cathode electrode be concentric with the cavities of the insulation layer and the gate electrode, and further, that the cavities of the cathode electrode, the insulation layer, and the gate electrode be of equal size.

In another embodiment, the present invention provides a cold cathode electron source including a substrate on which are deposited a catalyst metal layer, an insulation layer, and a gate metal layer; a cavity section formed through the catalyst metal layer, the insulation layer, and the gate metal layer; and an emitter realized through a plurality of carbon nanotubes, which are grown from walls of the catalyst metal layer exposed in the cavity section and which have long axes parallel to a surface of the substrate on which the catalyst metal layer, the insulation layer, and the gate metal layer are formed.

The method for manufacturing a cold cathode electron source includes depositing a catalyst metal layer, an insulation layer, and a gate metal layer on a substrate; forming a cavity section by removing a portion of the gate metal layer, the insulation layer, and the catalyst metal layer using a photolithography process; and forming an emitter by mounting the substrate on a chemical vapor deposition reactor, and growing carbon nanotubes in a low temperature atmosphere of under 800 degrees Celsius (° C.).

To achieve these and other objects in accordance with the principles of the present invention, as embodied and broadly described, the present invention provides an apparatus emitting electrons, comprising: a substrate having a surface; a cathode electrode formed on the surface of said substrate, said cathode electrode forming a cavity of a predetermined size; and an emitter emitting electrons, said emitter including a plurality of carbon nanotubes formed on at least one wall of the cavity of said cathode electrode, the nanotubes being substantially parallel to the surface of said substrate.

To achieve these and other objects in accordance with the principles of the present invention, as embodied and broadly described, the present invention provides an apparatus, comprising: a substrate having a catalyst metal layer, an insulation layer, and a gate metal layer deposited on a surface of said substrate, the three layers forming a cavity section; and an emitter including a plurality of carbon nanotubes formed on at least one wall of the cavity section, the nanotubes being substantially parallel to the surface of said substrate.

To achieve these and other objects in accordance with the principles of the present invention, as embodied and broadly described, the present invention provides a method for manufacturing a cold cathode electron source, comprising: depositing a catalyst metal layer, an insulation layer, and a gate metal layer on a substrate; removing a portion of the gate metal layer, the insulation layer, and the catalyst metal layer, to form a cavity section; and forming an emitter by growing a plurality of carbon nanotubes from at least one wall of the catalyst metal layer exposed in the cavity section, the nanotubes being substantially parallel to the surface of the substrate.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 6:
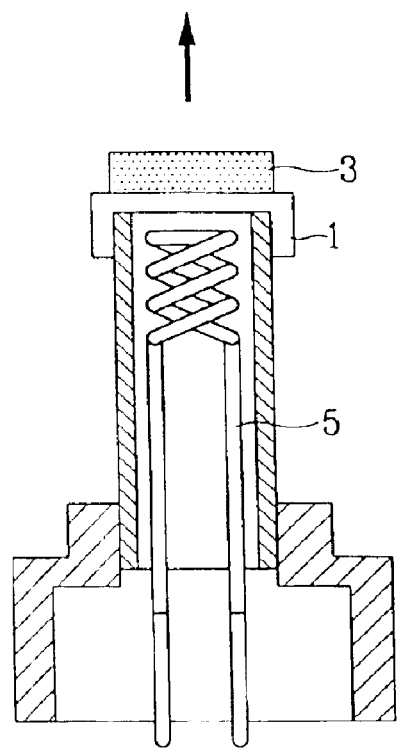
FIG. 6 is a sectional view of a hot cathode electron source.

FIG. 6 is a sectional view of a hot cathode electron source. As shown in FIG. 6, the hot cathode electron source includes a metal base 1 (made of nickel containing a small amount of magnesium and silicon), a carbonate coating layer 3, and a heater 5 for heating the carbonate coating layer 3. Heat generated by the heater 5 causes a reduction reaction in the carbonate and the magnesium and silicon contained in the metal base 1 to thereby emit thermal electrons.

However, since the hot cathode electron source operates at high temperatures of approximately 800 degrees Celsius (° C.) and greater, a large amount of power is consumed by the heater, using roughly 10% of the total power needed by the cathode ray tube. Further, because time is required before electrons may be emitted from the hot cathode electron source following application of power to the cathode ray tube, the immediate display of images does not occur.

On the other hand, the cold cathode electron source utilizes a field emission phenomenon, in which an electric field is focused in the area of an emitter to emit electrons by a tunneling effect. Compared to the hot cathode electron source, the cold cathode electron source consumes a small amount of power and can realize the instantaneous emission of electrons. Further, an electron gun for a cathode ray tube utilizing the cold cathode electron source is reduced in length, and is more easily manufactured to thereby reduce manufacturing costs.

Cold cathode electron sources first introduced used sharp tips, that is, spindt-type metal tips (typically molybdenum tips), as emitters. However, manufacture of the spindt-type metal tips is complicated, and the property of the metal tips is easily deteriorated, making them unsuitable for mass production.

As a result, technology for manufacturing film type emitters is now being researched, in which the manufacturing processes involved are simple, and a material is used that is chemically stable while having a low work function to enable the emission of electrons at low voltages, approximately 10 to 50 volts (V). It is known that carbon-based materials—typically graphite, diamond, diamond like carbon, and carbon nanotubes—are suitable for use in manufacture of these emitters. In particular, it is believed that carbon nanotubes are the most ideal material structure for use as cold cathode electron sources since carbon nanotubes have an extremely minute curvature radius (at ends thereof) on the order of 100 angstroms (Å) to be sufficiently pointed for focusing an electric field.

Figure 7:
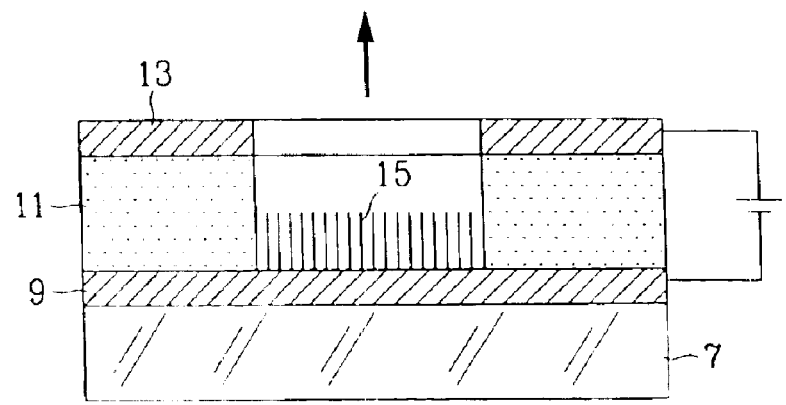
FIG. 7 is a sectional view of a cold cathode electron source.

FIG. 7 is a sectional view of a cold cathode electron source. FIG. 7 shows a view of a cold cathode electron source in which carbon nanotubes are grown using a chemical vapor deposition (CVD) process.

With reference to the drawing, in the cold cathode electron source, a catalyst metal layer 9 is formed on a silicon substrate 7 then an insulation layer 11 is formed on the catalyst metal layer 9 and a gate metal layer 13 is formed on the insulation layer 11. Subsequently, a portion of the gate metal layer 13 and a corresponding portion of the insulation layer 11 are removed using a photolithography process such that the catalyst metal layer 9 is exposed. Following this step, carbon nanotubes 15 are vertically grown on the catalyst metal layer 9 using a chemical vapor deposition (CVD) process.

In the cold cathode electron source structured as in the above, an electric field is focused at ends of the carbon nanotubes 15 by a difference in potential between the gate metal layer 13 and the catalyst metal layer 9, and electrons are emitted from the ends of the carbon nanotubes 15. With such an electron emission principle in mind, most of the research up to now has been concentrated on ways to grow the carbon nanotubes 15 as vertically as possible from the catalyst metal layer 9 to expose the ends of the carbon nanotubes 15.

In the case where the chemical vapor deposition (CVD) process is used to grow carbon nanotubes at a temperature of 800 degrees Celsius (° C.) and lower, many defects result on wall surfaces of the carbon nanotubes. Electrons are easily emitted from these defects. However, such defects cannot be used as a source from which electrons are emitted if the carbon nanotubes are grown vertically as in certain methods of at least some of the related art described above.

Further, it is common for catalyst metal particles to be present on ends of the carbon nanotubes. However, because the catalyst metal particles interfere with the electron emission of the carbon nanotubes, this limits attempts at increasing an electron density, and also increases a turn-on voltage that initiates electron emission, thereby preventing low voltage driving.

Figure 1:
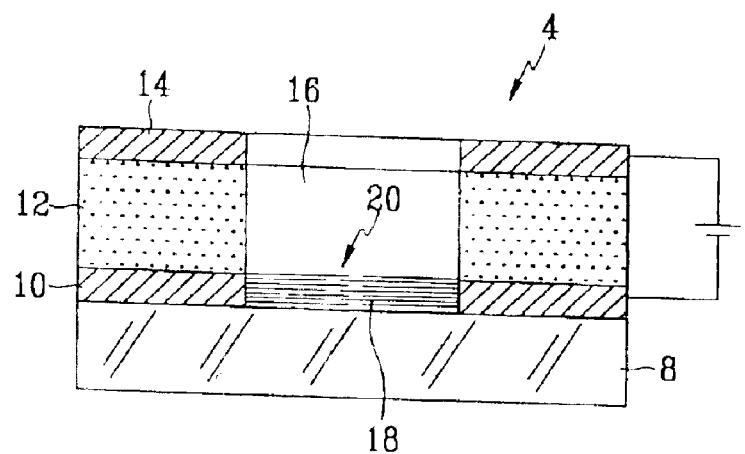
FIG. 1 is a sectional view of a preferred embodiment of a cold cathode electron source, in accordance with the principles of the present invention.

Preferred embodiments of the present invention will now be described in detail with reference to the accompanying drawings. FIG. 1 is a sectional view of a preferred embodiment of a cold cathode electron source, in accordance with the principles of the present invention. Reference numeral 4 in the drawing indicates the cold cathode electron source.

The cold cathode electron source 4 includes a silicon substrate 8; a catalyst metal layer 10, an insulation layer 12, and a gate metal layer 14 deposited in this sequence on the silicon substrate 8; a cavity section 16 formed by removing portions of the catalyst metal layer 10, the insulation layer 12, and the gate metal layer 14; and an emitter 20, formed on the insulation layer 12 in the cavity section 16 and comprised of a plurality of carbon nanotubes 18.

The catalyst metal layer 10 is made of nickel, cobalt, iron, or an alloy of these elements. The cavity section 16 is formed through a center portion of the catalyst metal layer 10 such that walls (hereinafter referred to as side walls) of the catalyst metal layer 10 adjacent to the cavity section 16 are exposed. The emitter 20 is realized by a structure in which the nanotubes 18 are formed parallel to the silicon substrate 8 and alternatively from the exposed side walls of the catalyst metal layer 10. As a result, side surfaces of the carbon nanotubes 18 in a long direction thereof are exposed in a direction toward the gate metal layer 14.

The emitter 20 is formed by a structure having carbon nanotubes 18 formed parallel to the silicon substrate 8, with the nanotubes 18 being formed so as to be perpendicular to the walls of the cavity section 16. The nanotubes 18 are grown sideways from the walls of the cavity section 16. The nanotubes 18 are formed to be spaced apart from each other. Nanotubes may bump into or abut the tips of other nanotubes when the nanotubes are grown to the length of the cavity radius because the nanotubes will be grown from the wall of the cavity 16 at nearly the same time, and all nanotubes are not always formed in an exactly straight shape. It is not necessary to have the nanotubes grow to reach the opposite wall, and it is sufficient to have the nanotubes grow so that the tips of them bump into the tips of other nanotubes.

The nanotubes 18 of the present invention are oriented so as to be parallel to a substrate 8 so that the ends or tips of the nanotubes 18 point toward an opposing wall of cavity 16, as depicted in FIG. 1 of the present invention. On the contrary, the nanotubes 32 of the related art reference Chuang (U.S. Pat. No. 6,062,931) are oriented so as to be perpendicular to a catalyst substrate layer 13 that the tips of the nanotubes 32 point upward and away from substrate 13 (as depicted in FIG. 6 of Chuang '931).

Figure 2:
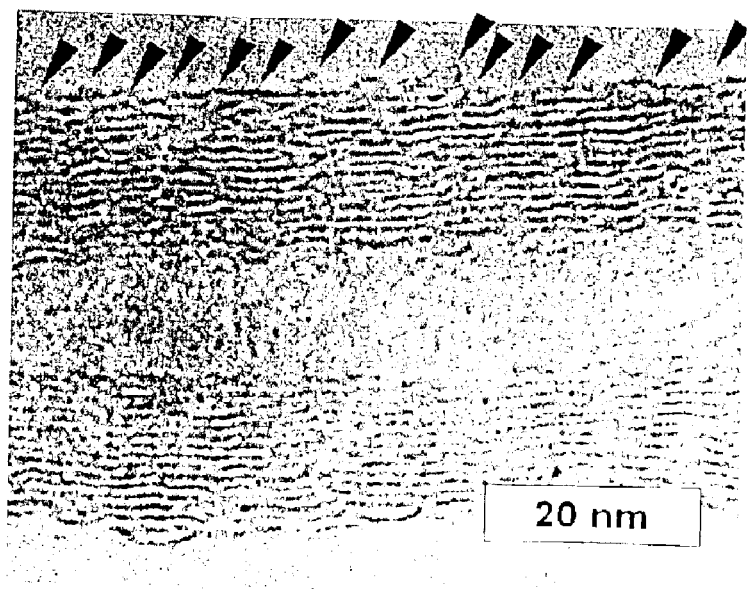
FIG. 2 is an electron microscope photograph showing side surface defects of carbon nanotubes in a preferred embodiment of a cold cathode electron source manufactured in accordance with the principles of the present invention.

FIG. 2 is an electron microscope photograph showing side surface defects of carbon nanotubes in a preferred embodiment of a cold cathode electron source manufactured in accordance with the principles of the present invention. A length of 20 nanometers (nm) is shown in the drawing.

The carbon nanotubes 18 are grown at a temperature of 800 degrees Celsius (° C.) or below using a chemical vapor deposition (CVD) process. A characteristic of low temperature growth is that a plurality of defects result on side surfaces of the carbon nanotubes 18 as shown in FIG. 2, that is, as shown at the ends of the arrows in FIG. 2. A defect refers to the incomplete graphitization of carbon atoms such that instead of realizing the normal hexagonal shape of graphite, a five- or seven-sided configuration results. It also refers to the formation of dangling bonds of the carbon atoms on wall surfaces of the carbon nanotubes 18.

A curvature radius of the defects is approximately 10 angstroms (Å), and since this is smaller than a curvature radius of 100 angstroms (Å) at ends of the carbon nanotubes 18, a greater field enhancement factor is achieved than when growing the carbon nanotubes 18 perpendicular to the silicon substrate 8 under the same conditions. Therefore, the focusing of an electric field is more easily performed such that excellent electron emission characteristics are obtained with the defects.

Therefore, by growing the carbon nanotubes 18 parallel to the upper surface of the substrate 8 (horizontal in the drawing) and alternatively from the side walls of the catalyst metal layer 10 in such a manner that defects on the side surfaces of the carbon nanotubes 18 are arranged in a direction toward the gate metal layer 14, the defects may be used as electron emitting sources.

Accordingly, if a negative (−) voltage is applied to the catalyst metal layer 10 and a positive (+) voltage is applied to the gate metal layer 14, an electric field is focused at the defects of the carbon nanotubes 18 to thereby realize electron emission from the defects. As a result, a turn-on voltage, by which electron emission is initiated, is reduced and a current density is increased.

Figure 3:
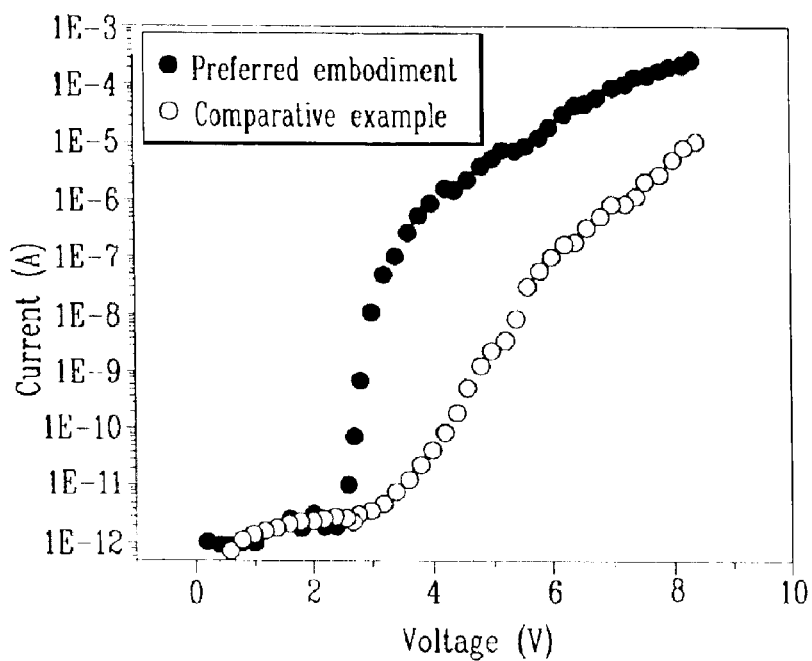
FIG. 3 is a graph showing a relationship between voltage and current, with the graph firstly illustrating drive voltage and electric field characteristics of a "comparative example" cold cathode electron source that is not manufactured in accordance with the principles of the present invention, and with the graph secondly illustrating drive voltage and electric field characteristics of a "preferred embodiment" cold cathode electron source manufactured in accordance with the principles of the present invention.

FIG. 3 is a graph showing a relationship between voltage and current, with the graph firstly illustrating drive voltage and electric field characteristics of a "comparative example" cold cathode electron source that is not manufactured in accordance with the principles of the present invention, and with the graph secondly illustrating drive voltage and electric field characteristics of a "preferred embodiment" cold cathode electron source manufactured in accordance with the principles of the present invention.

Thus, FIG. 3 is a graph showing a relation between voltage and current for illustrating drive voltage and electric field characteristics in a first cold cathode electron source (hereinafter referred to as the comparative example) and in a second cold cathode electron source according to the preferred embodiment of the present invention (hereinafter referred to as the preferred embodiment).

In the graph, the preferred embodiment is indicated by the solid circles (●) while the comparative example is indicated by the open circles (○). Acetylene and argon gas are used at a temperature of 650 degrees Celsius (° C.) to grow the carbon nanotubes of the preferred embodiment for 10 minutes and the carbon nanotubes of the comparative example for 3 minutes.

The vertical axis in the graph represents an emission current density. As is evident from the graph, a current density of the cold cathode electron source of the preferred embodiment is higher than that of the cold cathode electron source of the comparative example. This clearly indicates that an electron emission quantity is increased in the preferred embodiment of the present invention.

Figure 4:
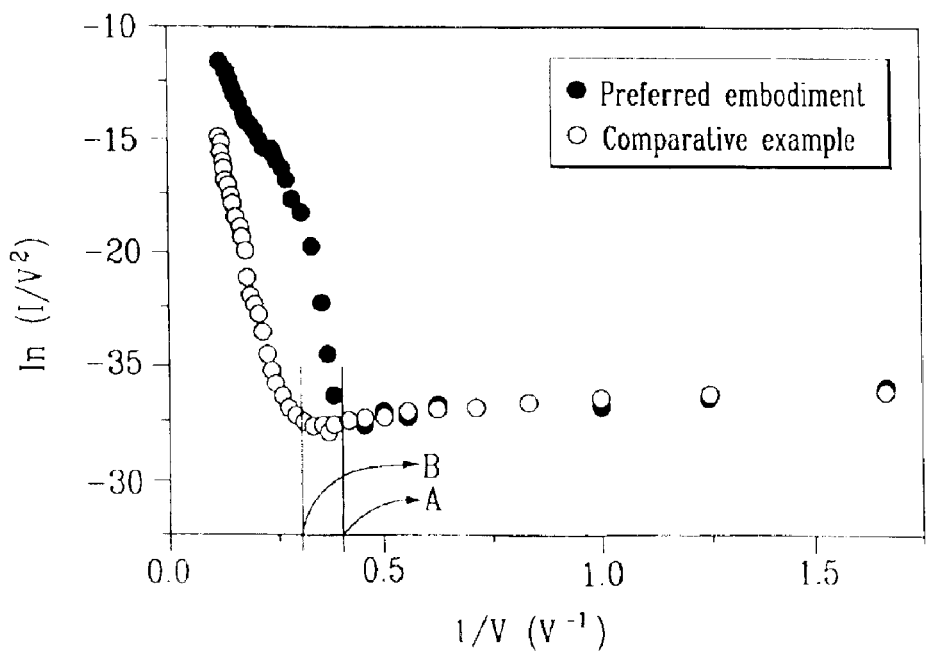
FIG. 4 is a Fowler-Nordheim plot which firstly shows drive voltage and electric field characteristics of a "comparative example" cold cathode electron source that is not manufactured in accordance with the principles of the present invention, and which secondly shows drive voltage and electric field characteristics of a "preferred embodiment" cold cathode electron source manufactured in accordance with the principles of the present invention.

FIG. 4 is a Fowler-Nordheim plot which firstly shows drive voltage and electric field characteristics of a "comparative example" cold cathode electron source that is not manufactured in accordance with the principles of the present invention, and which secondly shows drive voltage and electric field characteristics of a "preferred embodiment" cold cathode electron source manufactured in accordance with the principles of the present invention.

Thus, FIG. 4 is a Fowler-Nordheim plot showing drive voltage and electric field characteristics in a first cold cathode electron source (hereinafter referred to as the comparative example) and in a second cold cathode electron source according to a preferred embodiment of the present invention (hereinafter referred to as the preferred embodiment).

In the Fowler-Nordheim plot, points at which there is an abrupt change in the slopes (point A for the preferred embodiment and point B for the comparative example) indicate points at which electron emission starts. Voltages at these points are turn-on voltages.

The comparative example has a turn-on voltage of approximately 3.2 volts (V), while the preferred embodiment has a turn-on voltage of approximately 2.4V. Assuming that a thickness of an insulation layer is 2 micrometers ($\mu$m), the comparative example displays a turn-on electric field of 1.6V/$\mu$m while the preferred embodiment displays a turn-on electric field of 1.2V/$\mu$m, clearly indicating that the turn-on electric field is lower for the preferred embodiment. Further, it can be known from the substantially straight formation of the slopes in the Fowler-Nordheim plot that the measured currents are emitted from the cold cathodes by the field emission principle.

Figure 5A:
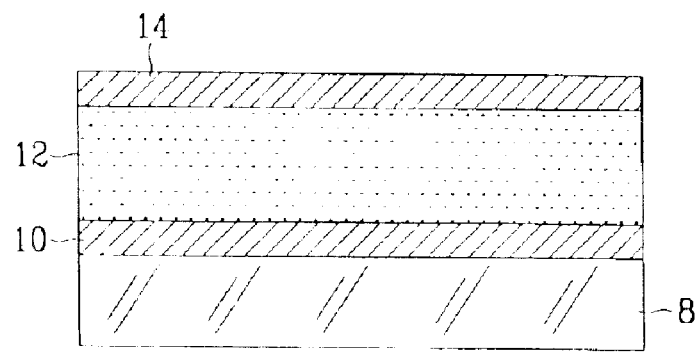
FIGS. 5A through 5C are sectional views showing sequential steps involved in a method for manufacturing a preferred embodiment of a cold cathode electron source, in accordance with the principles of the present invention.
Figure 5B:
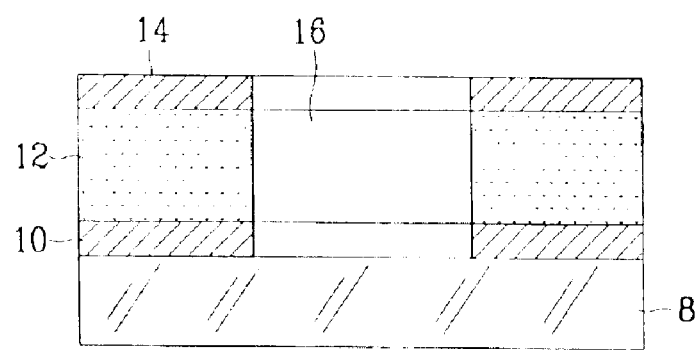
Figure 5C:
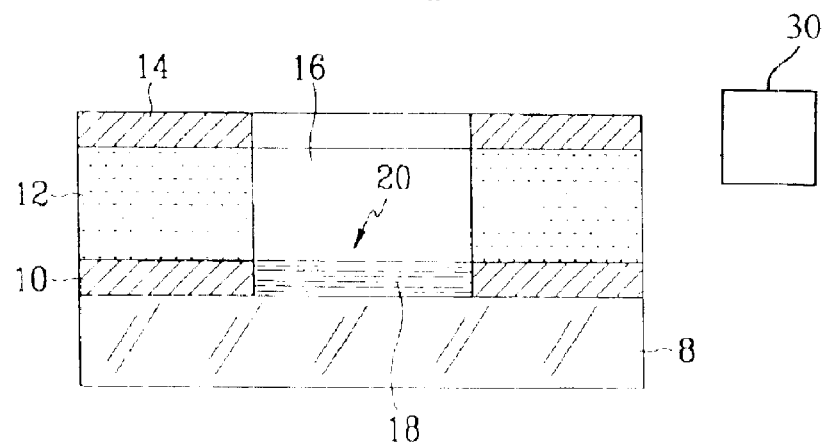

FIGS. 5A through 5C are sectional views showing sequential steps involved in a method for manufacturing a preferred embodiment of a cold cathode electron source, in accordance with the principles of the present invention.

Thus, FIGS. 5A through 5C are sectional views showing sequential steps involved in a method for manufacturing a cold cathode electron source according to a preferred embodiment of the present invention.

With reference to FIG. 5A, a silicon substrate 8 is prepared, then a catalyst metal layer 10, an insulation layer 12, and a gate metal layer 14 are deposited (in this order) on an upper surface of the silicon substrate 8. A physical vapor deposition (PVD) process or a chemical vapor deposition (CVD) process may used to deposit the catalyst metal layer 10, the insulation layer 12, and the gate metal layer 14.

The catalyst metal layer 10 is made of nickel, cobalt, iron, or an alloy of these elements. Since a thickness of the catalyst metal layer 10 determines a thickness of an emitter 20, which is formed in a subsequent step, it is preferable that the catalyst metal layer 10 be formed to a thickness of 0.5~1 micrometers ($\mu$m), in consideration of the desired thickness for the emitter 20.

The insulation layer 12 is made of a silicon oxidation film. The gate metal layer 14 is made of a chromium or molybdenum film. Since the insulation layer determines a spacing between the emitter 20 (to be formed in a subsequent step) and the gate metal layer 14, it is preferable that the insulation layer 12 be formed to a thickness of 1~2 micrometers ($\mu$m), in consideration of the desired spacing between the emitter 20 and the gate metal layer 14.

Subsequently, with reference to FIG. 5B, a photolithography process is used to selectively remove portions of the gate metal layer 14, the insulation layer 12, and the catalyst metal layer 10, thereby forming a cavity section 16. The photolithography process includes the steps of depositing a photoregister, exposure, developing, etching, and photoresist separation. As a result, portions of the catalyst metal layer 10 adjacent to the cavity section 16 (hereinafter referred to as side walls) are exposed.

Following the above, the silicon substrate 8 is mounted on a chemical vapor deposition (CVD) reactor not shown in FIG. 5C, and then carbon nanotubes 18 are grown for 10~30 minutes at a low temperature of 500~800 degrees Celsius (° C.) using a hydrocarbon gas. As a result, with reference to FIG. 5C, the emitter 20 is formed at a predetermined thickness by growing the carbon nanotubes 18 in a direction parallel to an upper surface of the silicon substrate 8 (i.e., long axes of the carbon nanotubes 18 are parallel to the upper surface of the silicon substrate 8) starting from the side walls of the catalyst metal layer 10.

The carbon nanotubes 18 grown in a low temperature atmosphere using a chemical vapor deposition (CVD) process have a countless number of defects on side walls exposed in the direction of the gate metal layer 14. These defects are used as an electron emitting source such that the turn-on voltage is lowered and the current density is increased, thereby improving the electron emitting characteristics of the cold cathode electron source.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus emitting electrons, comprising:
   a substrate having a surface;
   a cathode electrode formed on the surface of said substrate, a portion of said cathode electrode being partially removed to form a cavity of a predetermined size and to expose an interior side wall of said cathode electrode; and
   an emitter emitting electrons, said emitter including a plurality of carbon nanotubes formed on, and extending away from, said interior side wall of said cathode electrode, the carbon nanotubes being substantially parallel to the surface of said substrate;
   said nanotubes having a plurality of defects exposed in a direction away from said substrate, the electron being emitted from said defects.

2. The apparatus of claim 1, further comprising:
   an insulation layer formed on said cathode electrode, said insulation layer forming a cavity adjacent to the cavity of said cathode electrode; and
   a gate electrode formed on said insulation layer, said gate electrode forming a cavity adjacent to the cavity of said insulation layer.

3. The apparatus of claim 2, the cavity of said cathode electrode being concentric with the cavities of said insulation layer and said gate electrode.

4. The apparatus of claim 2, the cavities of said cathode electrode, said insulation layer, and said gate electrode being approximately of equal size.

5. The apparatus of claim 4, the nanotubes being substantially perpendicular to said interior side wall of the cavity of said cathode electrode.

6. The apparatus of claim 5, said cathode electrode and said emitter having a thickness in a range of 0.5 to 1 micrometers ($\mu$m).

7. The apparatus of claim 2, said defects being exposed in a direction toward said gate electrode.

8. The apparatus of claim 6, said insulation layer having a thickness in a range of 1 to 2 micrometers ($\mu$m).

9. The apparatus of claim 8, said cathode electrode, said insulation layer, and said gate electrode being formed by a physical vapor deposition process.

10. The apparatus of claim 8, said cathode electrode, said insulation layer, and said gate electrode being formed by a chemical vapor deposition process.

11. The apparatus of claim 1, the nanotubes being substantially perpendicular to said interior side wall of the cavity of said cathode electrode.

12. An apparatus, comprising:
    a substrate;
    a catalyst metal layer formed on said substrate;
    an insulation layer formed on said catalyst metal layer; and
    a gate metal layer formed on said insulation layer;
    wherein each of said catalyst metal layer, said insulation layer and said gate metal layer has a portion thereof removed to form a cavity section and to expose interior side walls of said each of said layers;
    said apparatus further comprising an emitter including a plurality of carbon nanotubes formed on at least one side wall of the catalyst metal layer, said emitter emitting electrons from defects in side surfaces of the carbon nanotubes, the nanotubes being substantially parallel to the surface of said substrate.

13. The apparatus of claim 12, the defects in the side surfaces of the carbon nanotubes being exposed in a direction toward the gate metal layer.

14. The apparatus of claim 12, the catalyst metal layer and said emitter being formed so as to have a thickness in a range of 0.5 to 1 micrometers ($\mu$m).

15. A method for manufacturing a cold cathode electron source, comprising:
    depositing a catalyst metal layer, an insulation layer, and a gate metal layer on a substrate;
    removing portions of the gate metal layer, the insulation layer, and the catalyst metal layer to form a cavity section and to expose interior side walls of the gate metal layer, the insulation layer and the catalyst metal layer; and
    forming an emitter by growing a plurality of carbon nanotubes from the interior side wall of the catalyst metal layer exposed in the cavity section, the carbon nanotubes being substantially parallel to a surface of the substrate and having defects in side surfaces thereof, from which defects the electrons are emitted.

16. The method of claim 15, said growing of the carbon nanotubes being performed by mounting the substrate on a chemical vapor deposition reactor and exposing the catalyst metal layer to a carbonized gas at a low temperature in a range of 500 to 800 degrees Celsius (° C.).

17. The method of claim 16, said removing being performed by a photolithography process.

18. The method of claim 16, the catalyst metal layer having a thickness in a range of 0.5 to 1 micrometers ($\mu$m).

19. The method of claim 16, the insulation layer having a thickness in a range of 1 to 2 micrometers ($\mu$m).

20. The method of claim 15, wherein said defects in the side surfaces of the carbon nanotubes are exposed in a direction toward said gate metal layer and away from said substrate.

* * * * *